(12) United States Patent
Johri et al.

(10) Patent No.: US 8,451,712 B2
(45) Date of Patent: *May 28, 2013

(54) RESTORING AGGREGATED CIRCUITS WITH CIRCUIT INTEGRITY CHECKS IN A HIERARCHICAL NETWORK

(75) Inventors: Pravin Kumar Johri, Aberdeen, NJ (US); Bruce Cortez, Freehold, NJ (US); Sanja Durinovic-Johri, Aberdeen, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 330 days.

This patent is subject to a terminal disclaimer.

(21) Appl. No.: 12/886,914

(22) Filed: Sep. 21, 2010

(65) Prior Publication Data

US 2011/0007654 A1 Jan. 13, 2011

Related U.S. Application Data

(63) Continuation of application No. 12/069,636, filed on Feb. 12, 2008, now Pat. No. 7,801,024.

(51) Int. Cl.
*G06F 11/00* (2006.01)
*H04L 12/50* (2006.01)

(52) U.S. Cl.
USPC .............. 370/216; 370/373; 370/384

(58) Field of Classification Search
None
See application file for complete search history.

(56) References Cited

U.S. PATENT DOCUMENTS

| | | | |
|---|---|---|---|
| 6,130,876 A * | 10/2000 | Chaudhuri | 370/228 |
| 6,766,113 B1 * | 7/2004 | Al-Salameh et al. | 398/30 |
| 7,072,584 B1 * | 7/2006 | Lichtman et al. | 398/59 |
| 7,126,908 B1 * | 10/2006 | Lu et al. | 370/228 |
| 7,161,898 B1 * | 1/2007 | Mazzurco et al. | 370/217 |
| 7,170,852 B1 * | 1/2007 | Adler | 370/223 |
| 7,176,792 B2 * | 2/2007 | Pereira et al. | 340/506 |
| 7,352,956 B1 * | 4/2008 | Winter et al. | 386/343 |
| 7,496,295 B2 * | 2/2009 | Baldine et al. | 398/69 |
| 7,539,128 B2 * | 5/2009 | Lim et al. | 370/216 |
| 7,689,120 B2 * | 3/2010 | Hoang et al. | 398/57 |

* cited by examiner

*Primary Examiner* — Chi Pham
*Assistant Examiner* — Soon-Dong D Hyun
(74) *Attorney, Agent, or Firm* — Wolff & Samson PC

(57) ABSTRACT

A system and method is disclosed that assures component circuits transported in aggregated circuits restore correctly after an aggregated circuit fault. The system and method implements component circuit tail segment integrity checks whenever an aggregated circuit is restored in a higher level of a network hierarchy. Switches at both ends of an aggregated circuit perform circuit integrity checks of the tail segments of every component circuit. A failure of the component circuit integrity check on any component circuit causes that component circuit to be released and restored end-to-end.

20 Claims, 9 Drawing Sheets

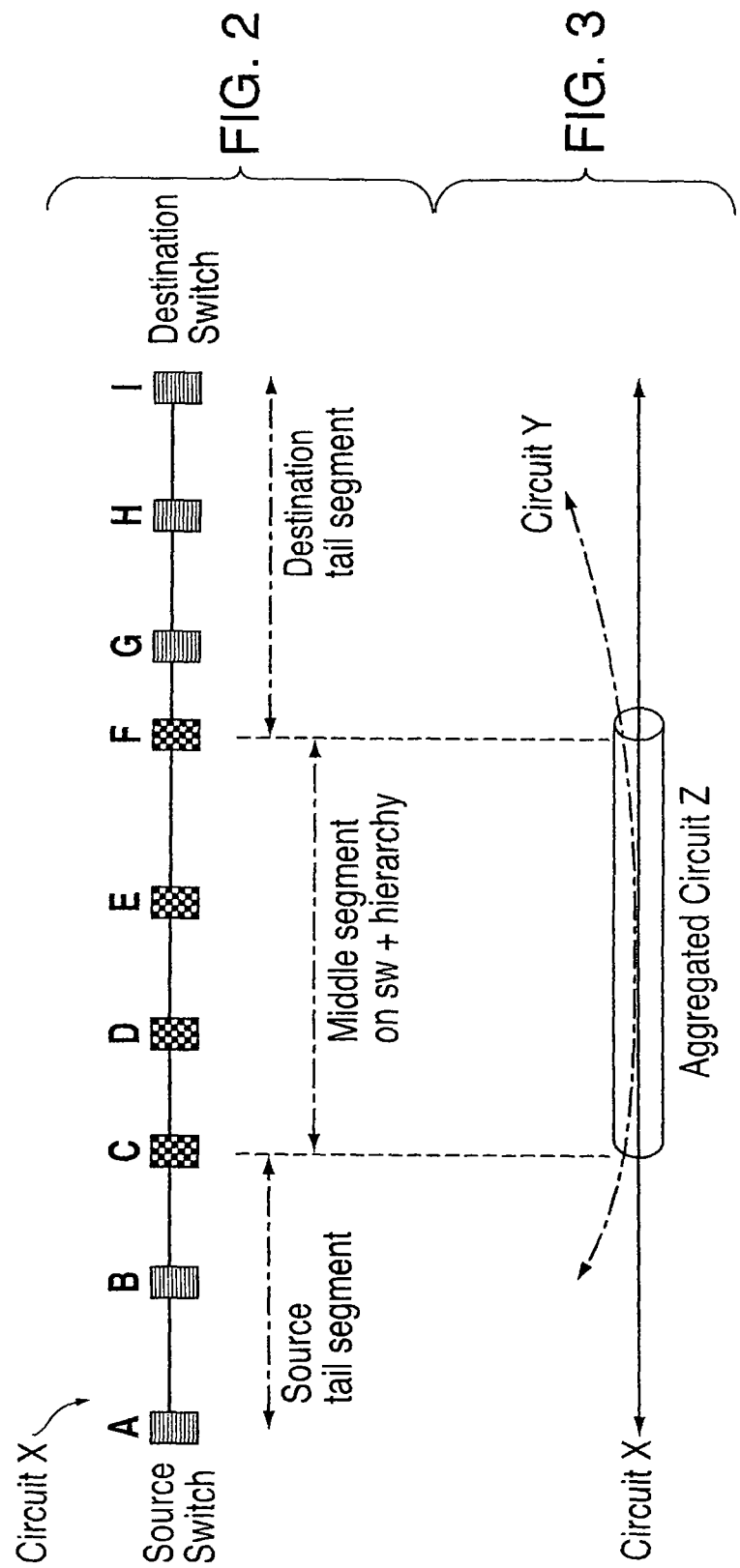

RESTORING AGGREGATED CIRCUITS WITH CIRCUIT INTEGRITY CHECKS IN A HIERARCHICAL NETWORK

This application claims priority, under 35 U.S.C. §120 to U.S. patent application Ser. No. 12/069,636 entitled "RESTORING AGGREGATED CIRCUITS WITH CIRCUIT INTEGRITY CHECKS IN A HEIRARCHICHAL NETWORK" to Johri, et. al., filed on Feb. 12, 2008, now U.S. Pat. No. 7,801,024, the content being incorporated by reference herein in its entirety.

BACKGROUND OF THE INVENTION

The invention relates generally to network communications. More specifically, the invention relates to a method and system for assuring component circuits transported in aggregated circuits restore correctly after an aggregated circuit fault.

With the advent of Ultra Long Haul (ULH) networks and planned availability of very high speed Optical Carrier OC-768 links, switched circuit-based networks will evolve from the current flat topology to a hierarchical network. The ULH Dense Wavelength Division Multiplexing (DWDM) transport optical network supports OC-768 core capacity with transmission speeds up to 40 Gbit/sec, carrying Internet Protocol (IP), Multi Protocol Label Switching (MPLS), and Synchronous Optical Network/Synchronous Optical Hierarchy (SONET/SDH) services.

Switched circuit-based networks typically include a number of switches connected by copper or optical communication lines. Switches are computer networking devices that encompass routers and bridges, as well as devices that may distribute traffic on load or by application content and may operate at one or more OSI layers, including physical, data link, network, or transport (end-to-end). There may be multiple lines between a given pair of switches and not every pair of switches needs to be connected to each other. Communication lines may be of various capacities that are generally expressed in bandwidth units such as OC-N, where N=48, 192, 768 . . . . Lines are often grouped, or aggregated, into links and certain information is associated with a link.

FIG. 1 shows a non-hierarchical network 101 that includes a plurality of switches 103, 105, 107, 109, 111 that define links 113, 115, 117, 119, 121, 123, 125 and two end systems 127, 129. A circuit 131 between the two end systems 127, 129 is provisioned going from switch 103 to switch 107. In non-hierarchical networks, circuits are provisioned between pairs of switches and several classes of services may be carried on these circuits.

A circuit 131 in a non-hierarchical network has two end points, a source switch 103 and a destination switch 107, and can span one or more intermediate switches 105. The source switch 103 is responsible for setting up the circuit and for restoring the circuit if a fault or failure in the network 101 route takes the circuit down. Switches in the circuit route adjacent to a failure detect the failure, identify that the circuit is affected by the failure, and send release messages to the source 103 and destination 107 switches. The release messages travel along the circuit route and release all resources held by the circuit. The source switch 103 tries to re-establish (restore) the circuit on an alternate route to the destination switch that avoids the point of failure. This is referred to as end-to-end restoration.

The end systems 127, 129 are connected to the network 101 but are not considered part of it. The circuit 131 between the end systems 127, 129 is established by routing it between the two switches connected to the end systems and network, and can span multiple links. The sequence of links spanned by the circuit is referred to as its service route.

If there is a failure in the network affecting one or more of the links or switches within the service route of the circuit, the circuit fails. In this case, the circuit may be re-routed on a new (restoration) route that avoids the failed portions of the network. After the failure is repaired, the circuit may revert back to its original service route.

Circuit restoration speeds are of paramount importance in such networks and sub-second restoration is guaranteed for a majority of premium circuits even in rather big failure scenarios. Typically, a single processor controls all restoration activities in each switch, and the restoration speed deteriorates with the number of failed circuits.

Most networks use routing and signaling protocols to automate a variety of functions such as self-discovery of network resources, construction and maintenance of a link-state database of routing information across all switches, automatic provisioning and restoration of circuits, determination of routes for provisioning and restoration of circuits, detection of network failure conditions, flooding of information related to any change in the state of the network to all switches including failures of switches and links, change in available bandwidth on a link and others. The routing and signaling protocols include Open Shortest Path First (OSPF), MPLS, Private Network-to-Network Interface (PNNI), etc., and variants of these protocols that have been adapted to specific networks or applications.

These networks are characterized by the fact that intelligence is distributed in every switch and is not centralized in one or more central locations. Typically, all switches run the same set of protocols although the functions performed by the switches may vary based on how the switches are used. For example, border switches in an OSPF domain have greater functionality than other switches. Thus, switches employing the same or similar protocols operate independently of each other. Any co-ordination of activities between switches is performed by sending messages to each other in ways prescribed by the routing and signaling protocols.

For cost saving efficient operation, multiple circuits are aggregated into a larger aggregated circuit referred to as a bundled circuit, tunnel, pipe, etc., establishing a higher level in a hierarchical architecture. Failures in the higher level cause the aggregated circuit to be released and restored as a single entity entirely within the higher level hierarchy. This allows for much faster restoration than if the individual "component" circuits making up the aggregated circuit were restored separately. Aggregated circuits can grow in size as individual component circuits provisioned in the network are added to the aggregated circuit and may shrink in size as individual circuits are de-provisioned. If there is a failure in the lower level of the hierarchy, each impacted component circuit is restored end-to-end even if it is part of an aggregated circuit somewhere along its route. A failed component circuit is de-provisioned from the aggregated circuit and then re-established in the network, for example, by joining another aggregated circuit along the restoration route.

With circuit aggregation in a two-level hierarchical network, an end-to-end circuit route typically has three components. There is a middle segment in the higher level hierarchy that may be part of an aggregated circuit, and two tail segments, a source tail segment and a destination tail segment at each end of the circuit. FIGS. 2 and 3 show a component circuit X that is part of an aggregated circuit Z. The route of component circuit X includes source switch A, destination switch I, and intermediate switches B-C-D-E-F-G-H.

Switches C, D, E, and F are SW+ switches (shown checkered) while the other switches are SW switches (shown solid). SW+ switches are capable of carrying higher speed circuits as well as multiplexing several lower speed circuits inside a higher speed circuit. In the example, the SW+ switches may mesh with OC-768 ULH links. Below this higher level may be a larger footprint with SW switches, meshed to each other and to the SW+ switches with OC-N links. The OC-768/SW+ part of the network is the higher level of the hierarchy and can support much larger circuit sizes. The SW part of the network is the lower level of the hierarchy and may have smaller circuit speeds. The most general circuit in the hierarchical network can begin and end in SW switches and may be provisioned over a sequence of SW and SW+ switches.

The aggregated circuit Z is defined between switches C and F. One of the switches acts as the source switch for the aggregated circuit, for example, switch C, and another switch, for example, switch F, acts as the destination switch of the aggregated circuit. FIG. 3 shows another component circuit Y that has been aggregated into aggregated circuit Z. Component circuit Y starts at switch B and ends at switch H.

A new circuit order is provisioned between a pair of switches. One switch is selected as the source switch of the circuit and the other becomes the destination switch. The source switch calculates a route for the circuit using information collected by the routing protocol. The information typically includes network topology, available network resources, etc. The route must have sufficient network resources to meet quality of service (QoS) requirements (bandwidth, delay, etc.) for the circuit. For example, in FIG. 1, the route calculated by source switch 103 for circuit 131 is via switch 105 to switch 107, and travels over links 113 and 115. The circuit route is specified as a sequence of links. For example, the route for circuit 131 is the sequence of links 113 and 115 and can be denoted as links {113, 115}. An alternative route between the source 103 and destination 107 switches using different links would be distinct from the route of circuit 131. For example, an alternative route comprising links {121, 123, 125}.

The source switch sets up the circuit using signaling protocol. A setup message is sent out along the calculated route of the circuit. Each switch in the route checks to see if the requested resources are available and then allocates the resources to the circuit. The setup message contains the selected route, so each switch in the route can forward the message to the next switch in the route. If all switches are able to allocate the resources, the setup succeeds. If not, it fails. A failed setup may result in a crankback message to the source switch that then tries to set the circuit up on a different route. Crankback is a mechanism originally used by Asynchronous Transfer Mode (ATM) networks. The new route must also have sufficient resources to meet the needs of the circuit.

A single optical fiber cut may cause multiple link failures in a network. Multiple failures where a link fails in each level of the hierarchy simultaneously results in the failure of the aggregated circuit as well as a tail segment of one or more component circuits. A failure in a component circuit tail segment will be restored end-to-end.

Whenever a failure occurs, a number of component and aggregated circuits may be impacted. The switches adjacent to the failure first detect the failure condition, identify the circuits affected by it, and then initiate signaling messages releasing the allocated circuits. The release messages travel back to the source and destination switches of the provisioned circuit, releasing all resources held by the circuit along the way. The source switch of each failed circuit then calculates a new route and tries to establish the failed circuit on the new route. This is referred to as restoring the circuit.

The new route must have sufficient resources to meet the needs of the circuit. It must also avoid the failed part of the network. Information about the failed part is disseminated by the routing protocol but there may be a short delay in receiving this information. The release (crankback) message may also contain information regarding where the circuit (setup) failed. Generally, the procedure used to restore the circuit is identical to the method used to provision it in the first place.

FIG. 4 shows three different failure points. Failure points 1 and 3 affect the source and destination tail segments of component circuit X and will cause end-to-end restoration of component circuit X. Failure point 2 affects aggregated circuit Z and causes restoration of just aggregated circuit Z on a new route between switches C and F, the two end switches of aggregated circuit Z. Since component circuit X is an aggregate circuit of aggregated circuit Z, the restoration of aggregated circuit Z results in the restoration of component circuit X as well.

Failure point 1 between switches A and B in the source tail segment of component circuit X is detected by switches A and B. Switch B determines that component circuit X has failed and sends a release message for circuit X towards component circuit X's destination switch I, along route B-C-D-E-F-G-H-I, releasing all resources held by circuit X along the route. Component circuit X will be de-provisioned from aggregated circuit Z by switches C, D, E and F as a result of the release message.

Source switch A also determines that component circuit X has failed and that it is the source switch of component circuit X. It therefore does not need to send any release message for component circuit X but has the responsibility to restore component circuit X on a route that avoids failure point 1.

Similarly, failure point 3 between switches F and G in the destination tail segment of component circuit X is detected by switches F and G. Switch F determines that component circuit X has failed and sends a release message for component circuit X towards the source switch A along the route F-E-D-C-B-A releasing all resources held by component circuit X along the way. The source switch A has the responsibility, as before, to restore the component circuit X along a route that avoids failure point 3. Switch F (and switches E, D, C as well) determines that component circuit X is part of aggregated circuit Z and, as part of the release process, de-allocates it from aggregated circuit Z. Switch G also determines that component circuit X has failed and sends a release message for component circuit X towards the destination switch I along the route G-H-I releasing all resources held by component circuit X along the way.

Failure point 2 in the middle segment where component circuit X is part of aggregated circuit Z is detected by switches E and F. Both switches determine that aggregated circuit Z is affected.

Switch E sends a release message for aggregated circuit Z to its source switch C along route E-D-C. The release message will cause resources held by aggregated circuit Z to be returned, and cause switch C to restore this aggregated circuit on an alternate route (not shown) that avoids failure point 2. The restoration for aggregated circuit Z is complete.

However, one required action for failure point 3 is for an end-to-end release message for circuit X to be sent by switch F to switch A along the route F-E-D-C-B-A. However, in a double failure scenario such as at failure points 2 and 3, this release message never makes it to switch E, or to any of the other switches along the route of the circuit to switch A. Switch A does not know that it should restore the circuit end-to-end. A release message for circuit X sent by switch G does reach switch I, but switch I is the destination switch of the component circuit X and cannot trigger restoration. It simply de-allocates resources held by circuit X and does nothing more. Therefore, the destination tail segment of component circuit X is not restored and component circuit X remains down even though aggregated circuit Z is successfully restored.

Not only is component circuit X not restored in this scenario, the switches have no way of knowing that component circuit X has not been restored. The normal protocol function is to repeatedly retransmit release messages, when a retransmit timer expires or until they are acknowledged by the recipient of the message. Switch F will attempt to retransmit the end-to-end release message to switch A repeatedly. The retransmitted messages will not go through until failure point 2 is repaired which may take several hours or even days depending on the severity of the problem.

It is imperative that a network recovers quickly from failures. The typical time taken to restore circuits may be in milliseconds if a few circuits are involved to several seconds if many circuits are involved. The entire process of detecting the failure, identifying the affected circuits, sending out release messages to the source and destination switches of each circuit, and the source switches then restoring their respective circuits, needs to be completed in a very short amount of time. Moreover, the entire process needs to work in the presence of failures.

The problem is that multiple failure scenarios prevent end-to-end circuit restoration from taking place because the component circuit release message cannot reach its source switch. The aggregated circuit will restore successfully. Since one of the tails of the component circuit in the lower level hierarchy has failed, that component circuit remains down.

What is desired is a system and method that ensures that whenever an aggregated circuit in a higher level of a network hierarchy is restored due to a failure in a link or network element, the component circuits making up the aggregation are restored as well.

SUMMARY OF THE INVENTION

The inventors have discovered that it would be desirable to have a system and method that implements component circuit tail segment integrity checks whenever an aggregated circuit is restored in a higher level of a network hierarchy. Switches at both ends of an aggregated circuit perform circuit integrity checks of the tail segments of every aggregated component circuit. A failure of the component circuit integrity check on any component circuit causes that component circuit to be released and restored end-to-end.

One aspect of the invention provides a method for assuring a component circuit transported in an aggregated circuit restores correctly after the aggregated circuit experiences a fault. Methods according to this aspect of the invention include restoring the aggregated circuit on a new route, wherein the aggregated circuit new route begins at an aggregated circuit source switch and ends at an aggregated circuit destination switch, for each component circuit transported in the aggregated circuit, accessing the component circuit identification and route wherein the component circuit route is defined by a source segment from a component circuit source switch to the aggregated circuit source switch, the aggregated circuit new route, and a destination segment from the aggregated circuit destination switch to a component circuit destination switch, forwarding a component circuit integrity check message from the aggregated circuit source switch to the component circuit source switch assessing functional status of the component circuit source segment, forwarding a component circuit integrity check message from the aggregated circuit destination switch to the component circuit destination switch assessing functional status of the component destination segment, and if the component circuit source segment and/or the destination segment are not functional, releasing the component circuit end-to-end thereby triggering an end-to-end restoration of the component circuit.

Another aspect of the method includes releasing aggregated circuit resources used to transport the component circuit if the component circuit is not functional.

Another aspect of the invention is a system for assuring a component circuit transported in an aggregated circuit restores correctly after the aggregated circuit experiences a fault. Systems according to this aspect of the invention include means for restoring the aggregated circuit on a new route, wherein the aggregated circuit new route begins at an aggregated circuit source switch and ends at an aggregated circuit destination switch, for each component circuit transported in the aggregated circuit, means for accessing the component circuit identification and route wherein the component circuit route is defined by a source segment from a component circuit source switch to the aggregated circuit source switch, the aggregated circuit new route, and a destination segment from the aggregated circuit destination switch to a component circuit destination switch, means for forwarding a component circuit integrity check message from the aggregated circuit source switch to the component circuit source switch assessing functional status of the component circuit source segment, means for forwarding a component circuit integrity check message from the aggregated circuit destination switch to the component circuit destination switch assessing functional status of the component destination segment, and if the component circuit source segment and/or the destination segment are not functional, means for releasing the component circuit end-to-end thereby triggering an end-to-end restoration of the component circuit.

Another aspect of the system includes means for releasing aggregated circuit resources used to transport the component circuit if the component circuit is not functional.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is an exemplary hierarchical network architecture transporting component circuit X from source switch A to destination switch I.

FIG. 3 is an exemplary hierarchical network aggregated circuit Z comprised of circuit X and circuit Y.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention.

The invention is taught using hierarchical networks employing SONET/SDH networks, but may be used with circuit-based communication networks such as optical/electrical switch or optical cross-connect networks, ATM networks, Frame Relay (FR) networks, networks of MPLS enabled label switched routers, and networks of Lambda (optical wavelength) routers. In hierarchical networks, lower speed SONET/SDH circuits may be carried inside higher speed SONET/SDH transport circuits as well as Optical Transport Network (OTN) containers in portions of the network. The invention is described referring to a two-level hierarchy but is applicable to multi-level hierarchies as well.

Most networks today just restore failed aggregated circuits in higher levels of network hierarchies. The method and system of the invention institutes component circuit integrity checks whenever an aggregated circuit restoration is attempted. These integrity checks are accomplished by sending circuit integrity check messages on each tail segment of each component circuit transported in an aggregated circuit to assess whether the tail segments are still functional. The circuit integrity check messages are initiated by the two end point switches of an aggregated circuit. If either component circuit tail segment integrity check fails, the component circuit is removed from the aggregated circuit and released end-to-end.

Figure 1:
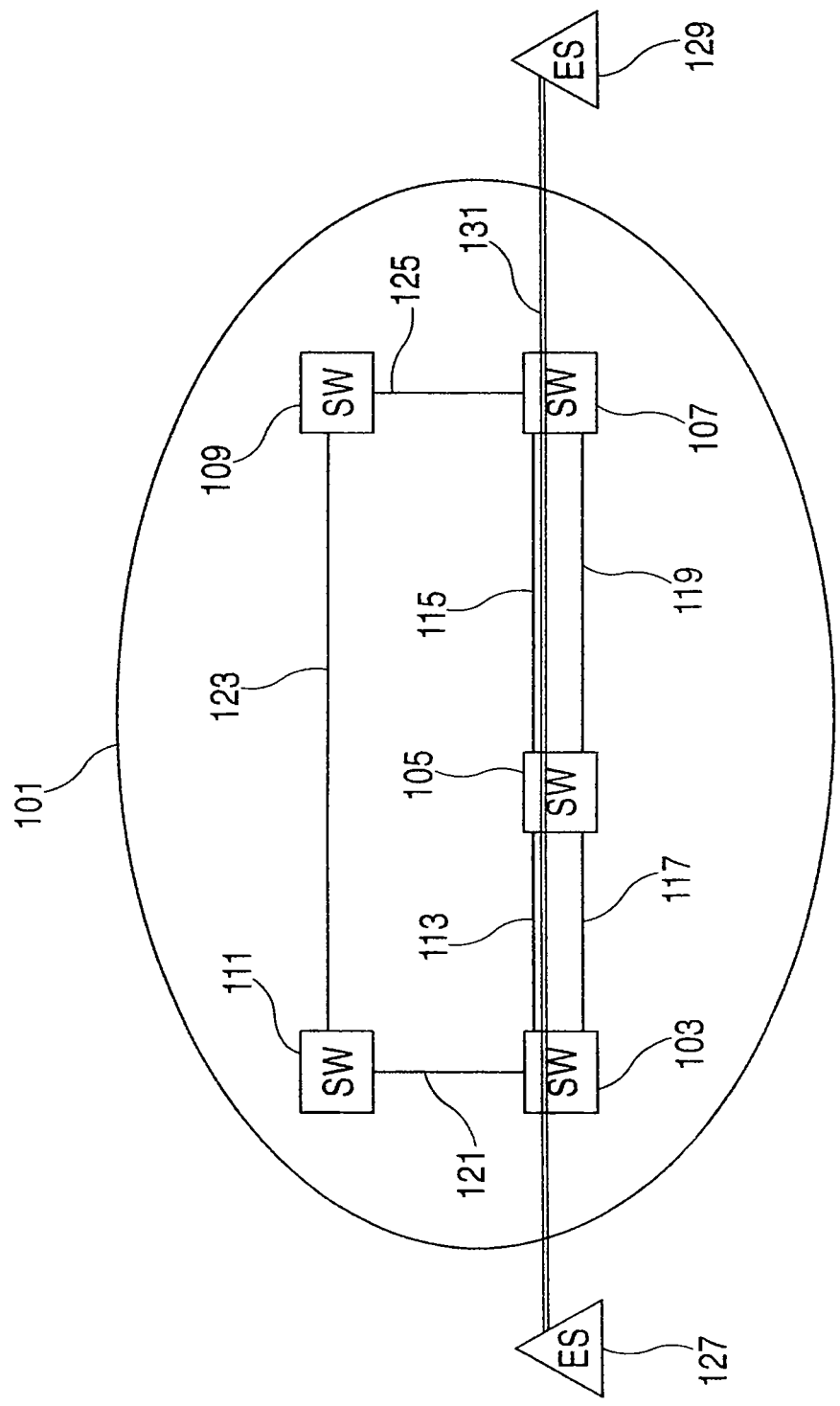
FIG. 1 is an exemplary non-hierarchical network architecture.
Figure 4:
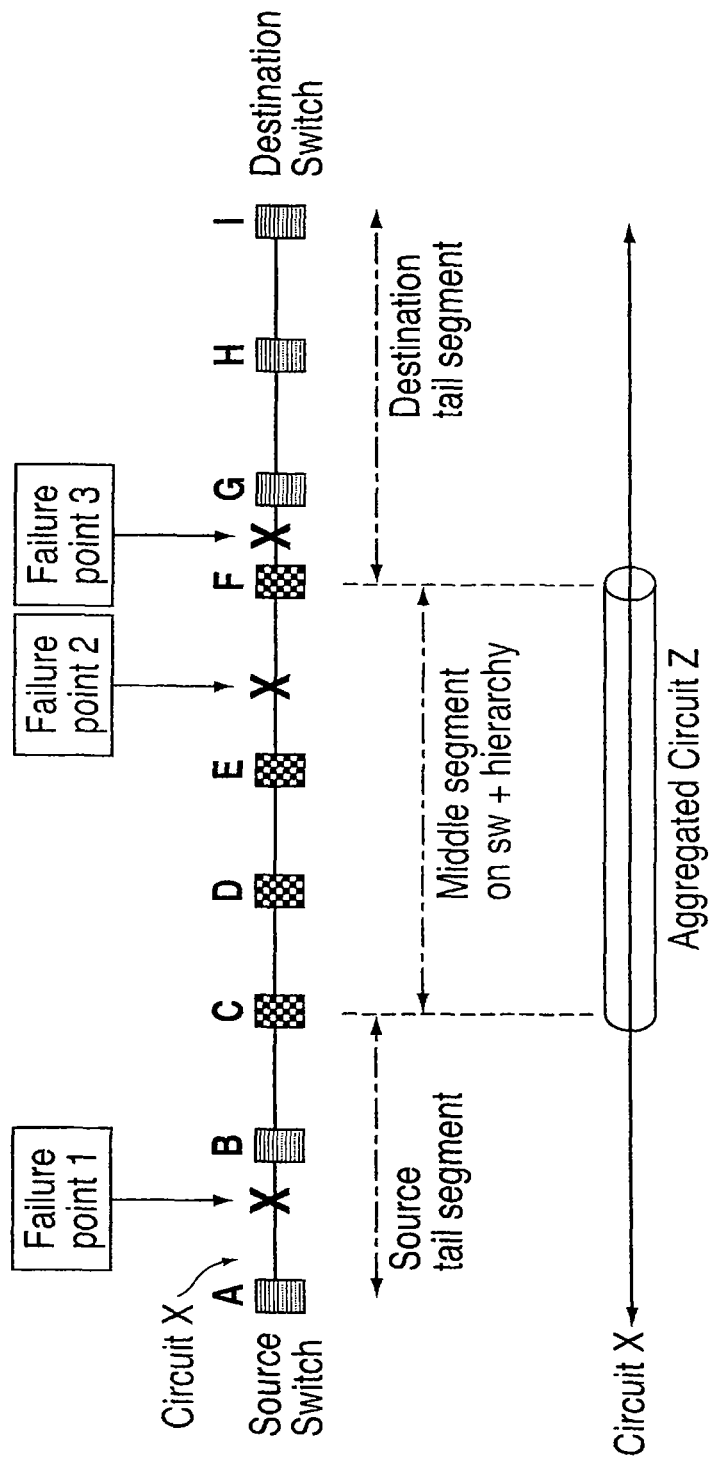
FIG. 4 is an exemplary hierarchical network architecture transporting component circuit X while experiencing multiple failures.

FIG. 4 shows where optical fiber cuts often cause multiple link failures in a network route. This type of multiple failure scenario can result in a simultaneous double failure at points 2 and 3 in the network.

One required action for failure point 2 is for aggregated circuit switch E to send a release message for aggregated circuit Z to aggregated circuit source switch C along the route E-D-C. The release message will cause resources held by aggregated circuit Z to be released, and cause switch C to restore the aggregated circuit Z on an alternate route to aggregated circuit Z destination switch F that avoids the failure at point 2.

One action for failure point 3 is for an end-to-end release message for component circuit X to be sent by switch F to switch A along the route F-E-D-C-B-A. However, since the link F-E has failed at failure point 2, the release message can never reach switch E, or to any of the other switches along the route of component circuit X to component circuit X source switch A. Switch A does not know that it should restore component circuit X end-to-end. A release message for component circuit X sent by switch G does reach component circuit X destination switch I, but destination switch I cannot trigger restoration.

The release message sent by switch G for circuit X de-allocates resources held by component circuit X and does nothing more. Therefore, the destination tail segment of component circuit X is not restored and component circuit X remains down even though the aggregated circuit Z will restore successfully. Not only did component circuit X not restore in this fault scenario, but the switches along the circuit route have no way of knowing that that the circuit has not been restored. The normal protocol function is to repeatedly retransmit release messages when a retransmit timer expires, or until the messages are acknowledged by the recipient of the message. Continuing the example, switch F will try to retransmit the end-to-end release message to component circuit X source switch A repeatedly. The retransmitted messages will not reach switch A until the failure at point 2 is repaired which may take several hours or days depending on the severity of the problem.

Aggregated circuit Z will be restored, but component circuit X will not. To ensure component circuit restoration in the likelihood of any multiple failure, the invention initiates component circuit source and destination tail segment integrity checks as an integral part of an aggregated circuit restoration. The source switch (C) and destination switch (F) for each aggregated circuit (Z) will check the integrity of every component circuit (X, Y) tail segment that the aggregated circuit transports in the event that the aggregated circuit suffers a fault or failure.

Figure 10:
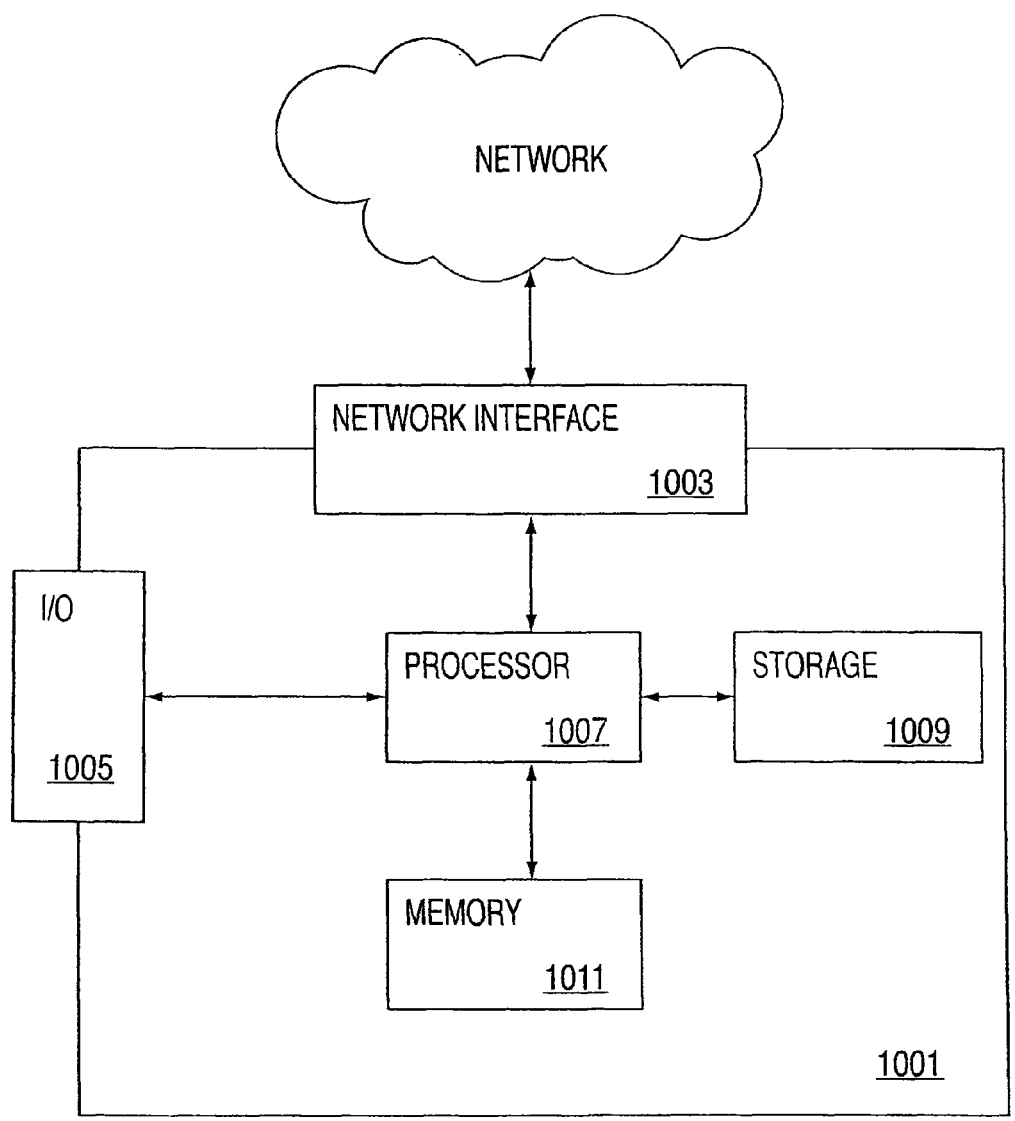
FIG. 10 is an exemplary switch schematic.

FIG. 10 shows a computer schematic enabled to act as a switch. Network switches may be implemented as computers using processors, memory, storage devices, software and other components. The computer 1001 includes a network interface 1003, I/O 1005, a processor 1007, storage 1009 and memory 1011. The processor 1007 is coupled to the network interface 1003, I/O 1005, storage 1009 and memory 1011 and controls the overall operation of the computer 1001 by executing instructions defining the switch configuration. The instructions may be stored in the storage device 1009 which may be a magnetic disk, and load into the memory 1011 when executing the configuration. The invention may be implemented as an application defined by the computer program instructions stored in the memory 1011 and/or storage 1009 and controlled by the processor 1007 executing the computer program instructions. The computer 1001 also includes at least one network interface 1003 coupled to a network and communicating with other switches. The I/O 1005 allows for user interaction with the computer 1001 via peripheral devices such as a display, a keyboard, a pointing device, and others.

Figure 5A:
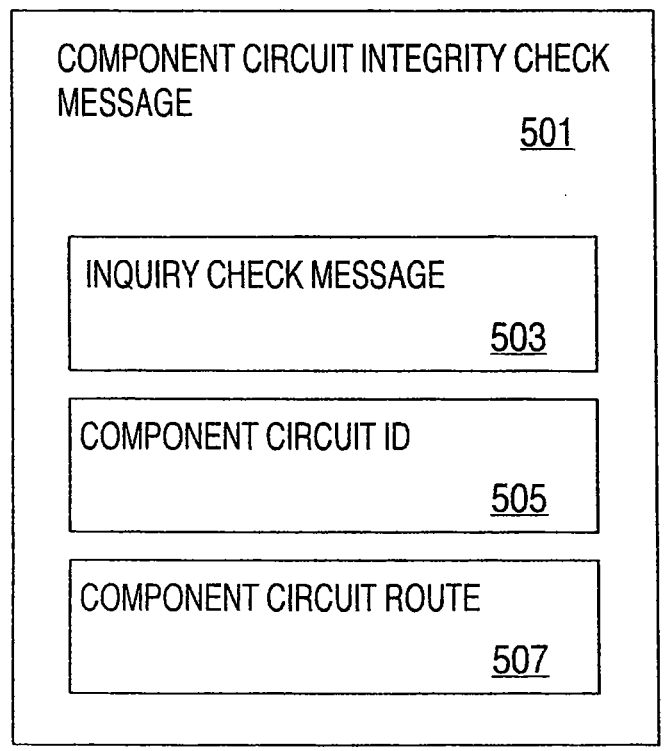
FIG. 5A is an exemplary component circuit integrity check message.
Figure 5B:
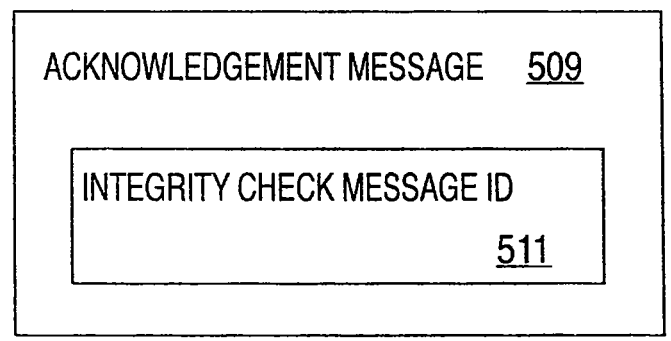
FIG. 5B is an exemplary component circuit integrity check acknowledgement message.
Figure 6:
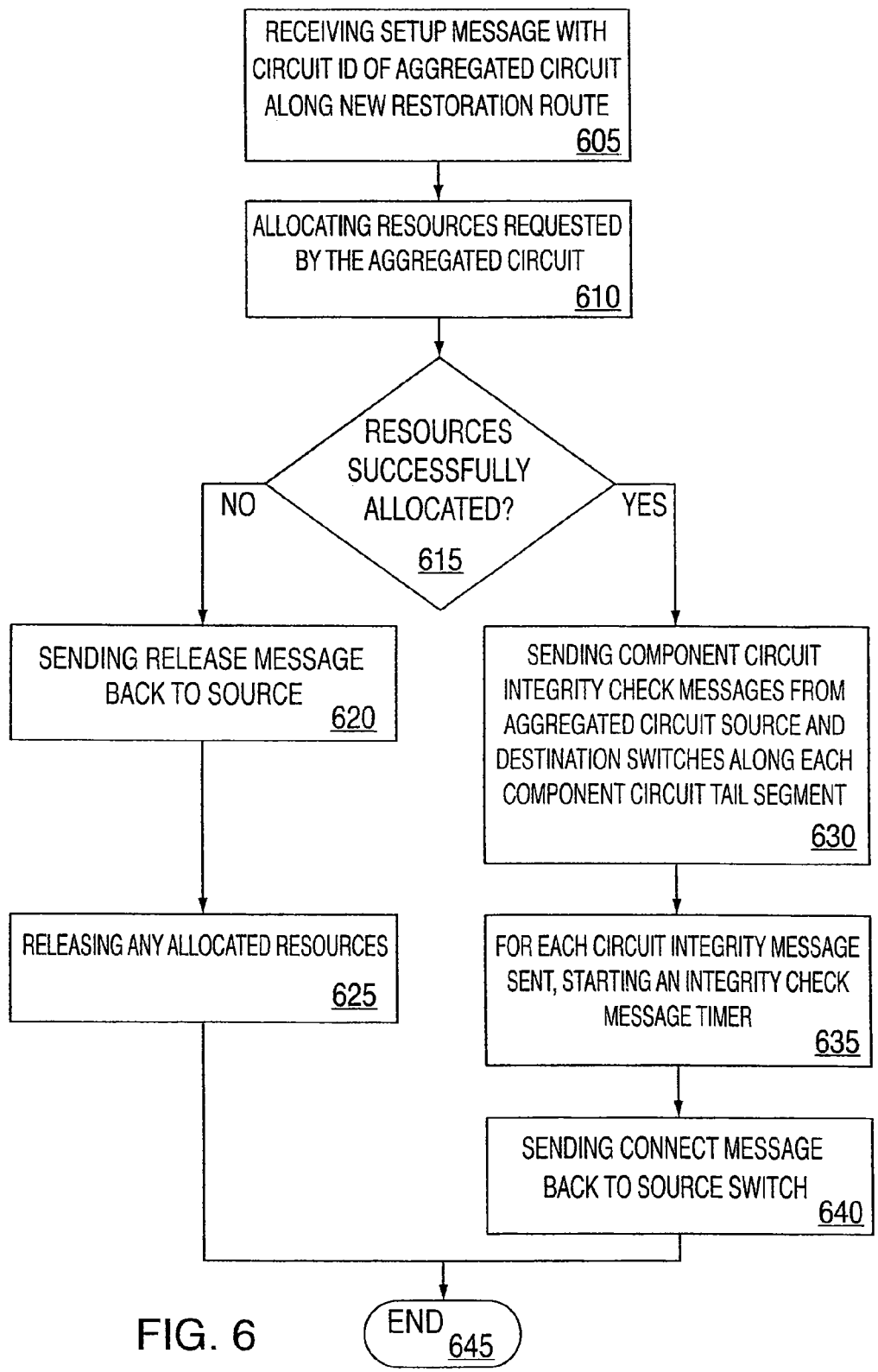
FIG. 6 is an exemplary aggregated circuit setup method with component circuit integrity checks.
Figure 7:
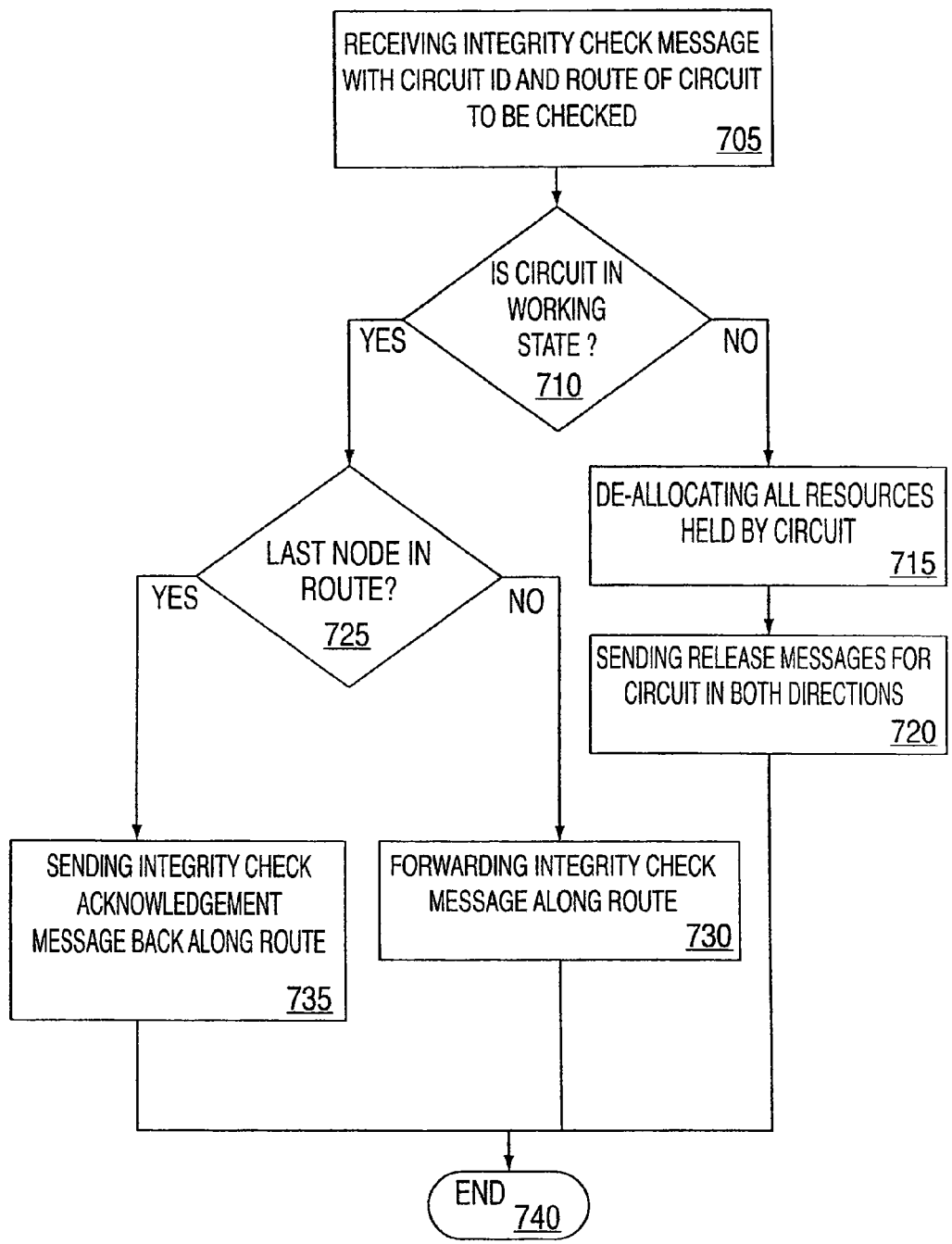
FIG. 7 is an exemplary method for processing a component circuit integrity check message.
Figure 8:
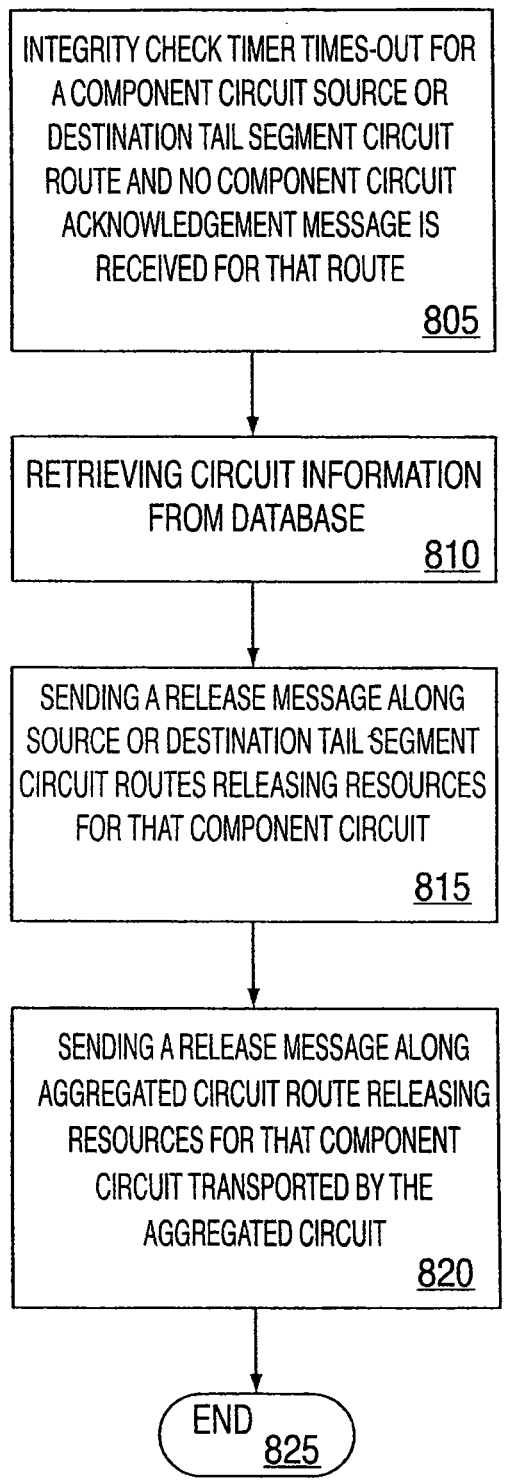
FIG. 8 is an exemplary method for processing a component circuit integrity check timer expiry.
Figure 9:
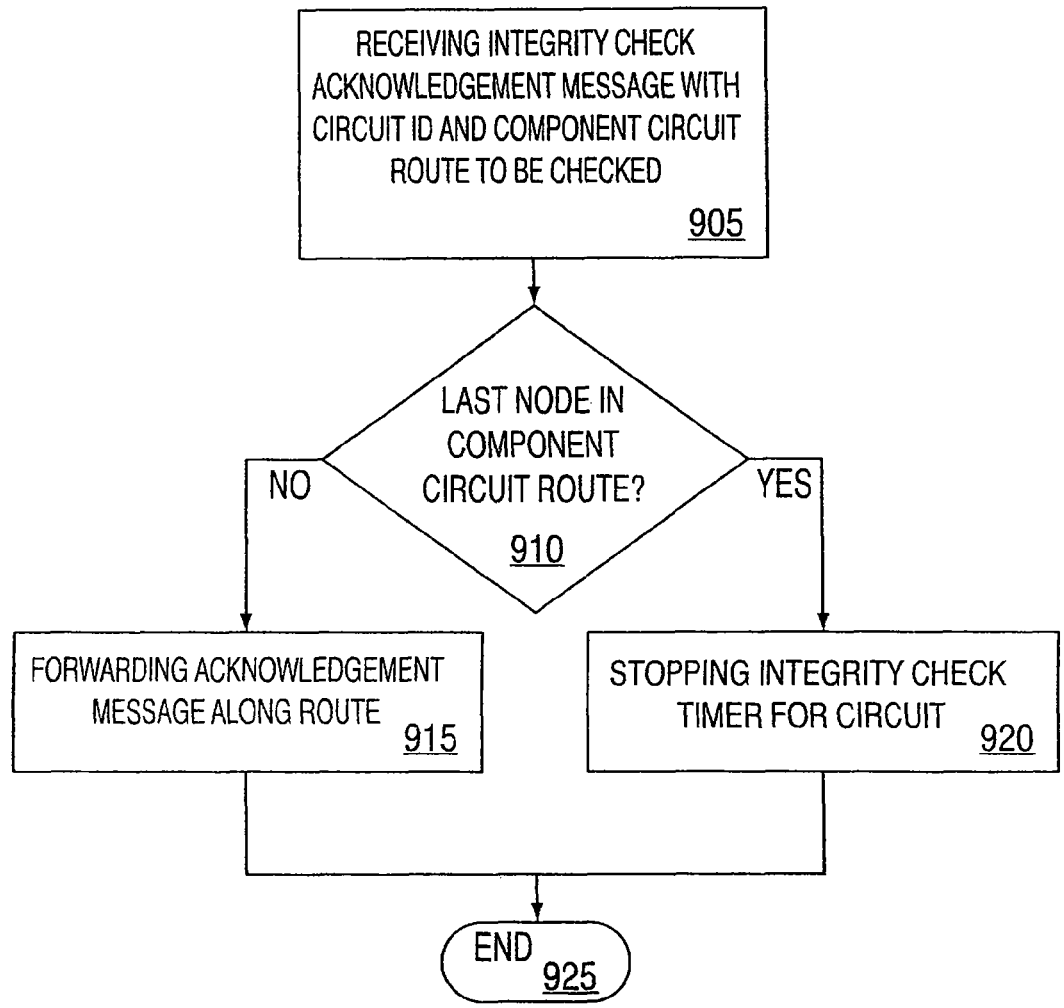
FIG. 9 is an exemplary method for processing a component circuit integrity check acknowledgement message.

FIGS. 5$a$, 5B, 6, 7, 8 and 9 show the component circuit integrity check message format 501, component circuit integrity check acknowledgement message 509 and methods of using the integrity check messages. When a release message for an aggregated circuit is received by its source switch, the switch calculates an alternate restoration route for the aggregated circuit from its source switch to the original destination switch, and sends a signaling setup message along the new route in order to restore the aggregated circuit. The aggregated circuit source switch identifies all component circuits assigned and transported in the aggregated circuit and each component circuit route. The setup message is received by each switch in the new route with the circuit ID of the aggregated circuit to be restored (step 605). Resources are allocated by each switch in the calculated route for the needs of the aggregated circuit. Resource allocation includes establishing cross-connects with the tail segments of all component circuits transported in the aggregated circuit (step 610).

When the aggregated circuit setup message sent by the aggregated circuit source switch along the new restoration route (due to the failure) reaches the aggregated circuit destination switch, the destination switch allocates new resources to the newly routed aggregated circuit, and then sends a connect signaling message to the source switch back along the new restoration route. This instructs the source switch and all other switches in the new route that the setup has succeeded. The destination switch sets all required cross-connects for each component circuit transported in the aggregated circuit such that each of their tail segments connect to the newly routed aggregate circuit. However, the destination switch does not check to see if the component circuits' tail segments are functioning properly.

If the resources cannot be allocated by a switch in the calculated route (step 615), any resources that have been partially allocated up to that location are released (step 620). A (release) message is sent by this switch back to the aggregated circuit source switch (steps 625, 645) to calculate another route.

If the resources can be successfully allocated from the aggregated circuit source switch to the aggregated circuit destination switch (step 615), component circuit integrity check messages are sent along each component circuit tail segment, from the aggregated circuit source switch to a component circuit source switch, and from the aggregated circuit destination switch to that components circuit's destination switch (step 630). The aggregated circuit source and destination switches will send component circuit integrity check messages 501 for the tail segments of each component circuit transported in the aggregated circuit. A circuit integrity check message 501 includes a functional query 503, the component ID of the component circuit 505 and the entire component circuit route 507. An integrity check message timer is started for a predetermined time period for each integrity message sent by the aggregated circuit source and destination switches (step 635). An acknowledgement message is sent from a component circuit destination switch back to its source switch (steps 640, 645).

Each switch within a component circuit's tail segment receives an integrity check message (step 705). If the switch in the tail segment is not the last node in that tail segment route (steps 725, 730, 740), the message is forwarded along the route. If the switch in the tail segment is the last node in the tail segment route, either the source or destination switch, an acknowledgment message 509 is sent back to the aggregated circuit source or destination switch noting that the component circuit tail segment is intact and functional (steps 725, 735, 740). The source and destination switches of the aggregated circuit are each responsible for its own component circuit tail segments. Either switch can release a component circuit or an aggregated circuit if a problem is detected. There is no problem if both switches release the same circuit if problems are detected at both ends. All circuits found to be non-functional are released towards their respective source and destination switches.

If the entire component circuit route does not have integrity, for example, the failure at point 3 which severs aggregated circuit Z from component circuit X, the switch ascertaining that the route for that component circuit cannot be completed (switch F) sends a release message in both directions (forward, and back along the new restoration route) releasing all resources for that component circuit (X) (steps 710, 715, 720, 740).

The aggregated circuit source or destination switches ascertain component circuit integrity by either receiving a component circuit integrity check acknowledgement reply message 509 from the component circuit's source or destination switches, meaning that each tail segment has integrity (steps 725, 735, 740), or that the integrity check timer has timed out (step 805). If the integrity check message timer times-out before receipt of a component circuit integrity check acknowledgement message 509, the information for that component circuit is retrieved from a database 1009 in the switch itself (step 810). This information was populated in the switch database when the circuit was provisioned. A message is sent along that component circuit's route releasing all tail segment resources for that circuit (step 815) and a second message is sent along the aggregated circuit path releasing all aggregated circuit resources held by the component circuit (steps 820, 825). That component circuit must then be completely re-established by its source switch end-to-end.

An integrity check acknowledgement message 509 including the component circuit ID 511 is received at switches in the tail segments of component circuits with the component circuit ID and including the route of the component circuit to be checked (step 905). If it is not the last node in the acknowledgement route (step 910), the acknowledgment message is forwarded along the route (steps 915, 925). If it is the last node in the acknowledgement route (step 910), the integrity check timer is stopped for that component circuit tail segment (steps 920, 925).

The invention prevents a multiple failure situation from taking down component circuits in a hierarchical network in a manner that present fault prevention can not restore. In such cases, some component circuits will not restore resulting in long outages until the customer detects the outage and complains. This situation is to be avoided. All premium component circuits in a typical SONET/SDH network have to be restored within one second requiring a probability greater than 99%.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for checking the integrity of switches in a component circuit, comprising:
   determining a status of a component source tail segment of the component circuit;
   determining a status of a component destination tail segment of the component circuit;
   releasing circuit resources associated with the component source tail segment based on the status of the component source tail segment; and
   releasing circuit resources associated with the component destination tail segment based on the status of the component source tail segment.

2. The method of claim 1, further comprising:
initiating an end-to-end restoration of the component circuit.

3. The method of claim 1, further comprising:
calculating an alternate transport route from a source switch to a destination switch of an aggregated circuit in response to a release of allocated resources within the aggregated circuit.

4. The method of claim 3, wherein determining the status of the component source tail segment and determining the status of the component destination tail segment is performed in response to calculation of the alternate transport route.

5. The method of claim 1, wherein determining the status of the component source tail segment comprises:
sending a first integrity check message to the component source tail segment; and
initiating a first timer in response to sending the first integrity check message; and
setting an expected reply period.

6. The method of claim 5, wherein determining the status of the component source tail segment further comprises:
receiving a first acknowledgement message in response to the first integrity check message, the first acknowledgement message including an indication that the component source tail segment is functional; and
stopping the first timer in response to receipt of the first acknowledgement message.

7. The method of claim 5, wherein determining the status of the component source tail segment further comprises:
determining that the component source tail segment is not functional in response to an expiration of the expected reply period.

8. The method of claim 1, wherein determining the status of the component destination tail segment comprises:
sending a second integrity check message to the component destination tail segment; and
initiating a second timer in response to sending the second integrity check message; and
setting an expected reply period.

9. The method of claim 8, wherein determining the status of the component destination tail segment further comprises:
receiving a second acknowledgement message in response to the second integrity check message, the second acknowledgement message including an indication that the component source tail segment is functional; and
stopping the second timer in response to receipt of the second acknowledgement message.

10. The method of claim 8, wherein determining the status of the component destination tail segment further comprises:
determining that the component destination tail segment is not functional in response to an expiration of the expected reply period.

11. An apparatus comprising:
a processor; and
a memory storing computer program instructions, the computer program instructions, which, when executed on the processor cause the processor to perform operations comprising:
determining a status of a component source tail segment of the component circuit;
determining a status of a component destination tail segment of the component circuit;
releasing circuit resources associated with the component source tail segment based on the status of the component source tail segment; and
releasing circuit resources associated with the component destination tail segment based on the status of the component source tail segment.

12. The system apparatus of claim 11, further comprising:
initiating an end-to-end restoration of the component circuit.

13. The system apparatus of claim 11, further comprising:
calculating an alternate transport route from a source switch to a destination switch of an aggregated circuit in response to a release of allocated resources within the aggregated circuit.

14. The apparatus of claim 13, wherein the status of the component source tail segment and the component destination tail segment is determined in response to calculation of the alternate transport route.

15. The apparatus of claim 11, wherein determining the status of the component source tail segment comprises:
sending a first integrity check message to the component source tail segment; and
initiating a first timer in response to sending the first integrity check message; and
setting an expected reply period.

16. The apparatus of claim 15, wherein determining the status of the component source tail segment further comprises:
receiving a first acknowledgement message in response to the first integrity check message, the first acknowledgement message including an indication that the component source tail segment is functional; and
stopping the first timer in response to receipt of the first acknowledgement message.

17. The apparatus of claim 15, wherein determining the status of the component source tail segment further comprises:
determining that the component source tail segment is not functional in response to an expiration of the expected reply period.

18. The apparatus of claim 11, wherein determining the status of the component destination tail segment comprises:
sending a second integrity check message to the component destination tail segment; and
initiating a second timer in response to sending the second integrity check message; and
setting an expected reply period.

19. The apparatus of claim 18, wherein determining the status of the component destination tail segment further comprises:
receiving a second acknowledgement message in response to the second integrity check message, the second acknowledgement message including an indication that the component source tail segment is functional; and
stopping the second timer in response to receipt of the second acknowledgement message.

20. The apparatus of claim 18, wherein determining the status of the component destination tail segment further comprises:
determining that the component destination tail segment is not functional in response to an expiration of the expected reply period.

* * * * *